United States Patent Office 2,790,702
Patented Apr. 30, 1957

2,790,702
ACID TREATMENT OF PHOSPHATE ROCK TO RECOVER PHOSPHATES AND URANIUM

Robert F. McCullough, Glenview, Ill., assignor, by mesne assignments, to the United States of America as represented by the United States Atomic Energy Commission No Drawing. Application June 21, 1955,
Serial No. 517,059

10 Claims. (Cl. 23—14.5)

This invention relates to a process of producing phosphate components for use in plant goods, animal feed supplements and the like. More particularly, it relates to a process for the manufacture of phosphatic products with uranium values recovered as a by-product from the raw materials processed. Still more particularly, it relates to a process wherein the uranium values are solubilized in a solution of higher uranium concentration and from which the uranium values are easily recovered.

In the past, phosphatic ores have been treated with mineral acids such as sulfuric, hydrochloric and the like. In order to improve the solubilizing of constituents, oxidizing agents such as nitric acid, potassium chlorate, hydrogen peroxide, etc., have been added to the sulfuric acid as shown in my co-pending application, Serial No. 313,058, entitled "Process of Producing Phosphatic Chemicals." After solubilizing the ore constituents, about 70% to about 90% of the uranium values will appear in a water soluble condition, the aqueous phosphatic solution is separated from acid insoluble constituents and the aqueous solution processed to recover calcium, ammonium or other desirable salts. This method has the disadvantage that constituents such as uranium are present as very minor percentages in large volumes of dilute solutions.

It is a primary object of this invention to overcome the disadvantages and shortcomings of processes heretofore in use.

It is a further object of this invention to provide a process wherein the uranium constituent is solubilized in solution having a higher concentration that heretofore.

It is a further object of this invention to recover uranium and/or its components from intermediate treatment stages in the production of phosphates and phosphate chemicals.

Other objects of this invention will be apparent to those skilled in the art from the description of the invention as hereinafter presented.

In the process of this invention a phosphatic material is mixed with sulfuric acid in an amount sufficient to convert the phosphate to the monocalcium phosphate state with constant and intensive agitation to form a rock-acid mix in paste form such as is sent to dens to age into super-phosphate. Chlorine gas is simultaneously bubbled through the reacting mixture during or immediately following the mixing period. Following leaching and separation of the unreacted material from aqueous solution of soluble reaction products, the unreacted material is subjected to a second agitation reaction with strong acidic solubilizing agents such as sulfuric acid, hydrochloric acid, nitric acid, sulfur dioxide and the like with or without oxidizing agents to increase the solubilization of uranium values.

More in detail, the phosphatic source material is best utilized if it is previously finely ground, i. e., 50 to 85% passing through a 200 mesh screen. Sulfuric acid of any convenient dilution, for example, about 51° to about 55° Bé., is added to the ground phosphate rock in such a proportion that there will be present in the mix between about 90% and about 120% of the stoichiometric amount of sulfuric acid required to convert all of the $P_2O_5$ present in the rock to monocalcium phosphate, allowing in addition, enough acid to also react with the impurities such as iron, alum, etc.

Although it is physically possible to agitate this freshly prepared admixture for a considerable period of time, maximum recovery of phosphorus values in their water soluble forms is obtainable when the period of agitation is only for a period of sufficient to afford intimate and uniform distribution of the sulfuric acid and chlorine containing gas through the rock-acid mix. This period of agitation has been found to be preferably about 1 to 2 minutes.

The chlorine in gaseous form is introduced during the mixing simultaneous with the introduction of sulfuric acid, although in the first stages of rock acid mixing, sulfuric acid may be introduced first. This chlorine is added to the extent of between about 0.5 lbs. and about 10 lbs., preferably between about 2 lbs. to about 5 lbs. per 100 lbs. of phosphate rock being treated. Chlorine added to the heavy slurry mix at this stage for some unexplained reason suppresses the solubilizing of uranium compounds. Addition of chlorine to the sulfuric acid before mixing with rock produced an oxidizing solution acting similar to those having an oxidizing agent present, i. e., produced a solution having increased solubilization of all constituents.

The heavy slurry prepared using, for example, 110% sulfuric acid acidulation, once having been thoroughly mixed, is passed onto a continuous and moving belt on which it is allowed to remain for a period of time sufficient to permit the soupy material to partially harden or set. This is usually between about 20 and about 60 minutes, but is not critical so long as the material is partially set when discharged from the belt. Upon discharge from the belt the material is transferred to a storage pile. When handled as above described it is easily removed from the pile after storage for from about one to about 30 days or more by means of mechanical shovels or scoops or manually. The material remains in the storage pile to allow the reactions to approach equilibrium and to bring the water-soluble $P_2O_5$ in the material up to the maximum within practical limits.

The aged superphosphate or acidified material is then agitated with previously prepared dilute leached solution to which water may have been added, if no water as such is added during the leaching. Sufficient liquid leaching medium is added so that the resulting slurry contains between about 30% and about 45% solids, although more concentrated or more dilute slurries may be formed if desired. The agitation and slurrying is for a short period, usually 5 to 15 minutes being sufficient. The slurry operation may be carried out at hot or atmospheric temperatures, but preferably while hot in order to reduce viscosity and to aid in subsequent faster separation of solids from liquid.

The aqueous phosphatic solution is then separated from the solids. Separation of these solids may be carried out in any convenient and conventional manner such as for example by countercurrent multi-stage filtration or decantation, preferably at temperatures of about 50° C. to 60° C. or by centrifuging or other equivalent operation.

The separated solids normally discarded as waste are next reacted in any one of three ways to recover the $P_2O_5$ and uranium content of the solids in predominantly phosphoric acid solution, or predominantly monocalcium phosphate solution, or in solution containing various proportions of phosphoric acid and monocalcium phosphate, i. e., wet process, such as the standard commercial process for the manufacture of phosphoric acid; autoclave super-atmospheric digestion; or the acid leaching system, such as is described in the first stage above. Preferably, the solids are agitated with sufficient aqueous solution of sulfuric acid to convert the unreacted phosphatic material which remains therein to phosphoric acid. In this method of secondary digestion, the unreacted solids are mixed with a quantity of sulfuric acid for example of 66° Bé. strength. The exact amount of acid employed will vary with the composition of the unreacted solids and the quantity of acid added may be determined as is well known in the art of phosphoric acid manufacture. Preferably a relatively small deficiency of sulfuric acid is used so that the resulting crude phosphoric acid contains no significant free sulfuric acid and preferably contains a very small amount of monocalcium phosphate. The mix of unreacted solids, acid and water is agitated for a time sufficient to effect substantially complete reaction of the acid used, the resultant product being an insoluble precipitate consisting chiefly of calcium, sulfate and liquor containing essentially phosphoric acid.

Phosphoric acid produced in this manner contrary to the normal process for producing phosphoric acid contains smaller amounts of impurities such as iron, aluminum and hydrofluosilicic acid. The phosphoric acid solution is separated from the acid insolubles and then processed as follows: the aqueous solution is subjected to contact with an organic solvent extractant or to contact with an anion resin to remove the uranium values from the phosphate values. The liquid phosphoric acid solution containing the uranium dissolved therein is preferably before extraction subjected to a reduction reaction. This may be accomplished by electrolytic means or by chemical reaction wherein the solution is treated with metallic iron or other free metals or reducing agents such as ferrous sulfate and sodium sulfoxyaldehyde, capable of reducing the solution, but not substantially introducing cations or anions detrimental to the specifications of phosphatic products subsequently recovered. The reduced aqueous solution is then intimately contacted, stirred or otherwise agitated with the organic solvent phase. This solvent phase is made up preferably of two components, an extractant and a vehicle or extender. The extractant may be one or more of the ortho or pyro-phosphoric acid esters of the alkyl monohydric alcohols. Both the mono and diesters, as well as mixtures of the two, are useful. The butyl, amyl, hexyl, heptyl, o-octyl, iso-octyl, etc., esters with the phosphoric acids are satisfactory for the purpose, but it is preferred to use the esters, either octyl or hexyl alcohol with ortho-phosphoric acid. The extender or vehicle may be any one or more of the common organic solvents such as naphtha, mineral spirits, carbon tetrachloride, trichloroethylene, toluene, xylenes and the like. The concentration of the extractant of the extender or vehicle may vary widely between about one and about 100%, preferably between about 5 and about 10%. The volume ratio of aqueous phase to organic phase also may vary within wide limits, for example, between about 1:1 and about 40:1, preferably between about 5:1 and about 20:1. A continuous extraction is usually carried out in multi-stage countercurrent extractors, for instance, using about six stages. After contact of the two phases, the aqueous phase is withdrawn from the bottom or first stage and the organic phase is withdrawn from the top or last stage of the contacting operation. The organic phase is treated preferably with aqueous HF in about 5 molar excess over that required to produce uranium tetrafluoride. This precipitated material is recovered by filtering, centrifuging and the like. The stripped organic solvent is recycled for further extraction use in the process.

The aqueous solution after contact with organic solvents may be processed for recovery of phosphate values in any one of a number of ways, for example, it may be evaporated to dryness to recover a mixture, depending upon the condition of drying, of ortho or pyro-phosphates or the solution may be treated with basic inorganic oxygen-containing compounds of an alkaline earth metals such as limestone or lime or other alkaline earth metal carbonates, oxides or hydroxides to precipitate impurities such as fluorine and the treated solution further reacted with substantially chemically pure basic inorganic oxygen-containing compounds of calcium such as calcium carbonate, calcium oxide, hydrated lime and equivalent materials.

The following example will further clarify the invention, but it is not intended that the scope of the invention be limited thereto.

*Example I*

Florida phosphate rock of about 68 BPL containing about 0.02% uranium oxide ($U_3O_8$) was ground to about 52% passing a 200 mesh standard screen. This ground rock was divided into three portions, A, B and C. Portion A was treated at the rate of about 2 tons per hour in a paddle mixer continuous operation with 51° Bé. aqueous sulfuric acid at about 115° F. to the extent of about 110% acidulation or a rate of about 1:0.94 tons per hour of acid of the above gravity. The mixer paddles were rotated at about 120 revolutions per minute and the mixing time averaged about one minute. The soupy mix was continuously discharged onto a moving belt where it remained for about one hour before discharge to the storage pile. The mix was allowed to age for approximately 30 days.

The friable cured acidulated rock mix was subjected to a four stage leaching operation, the water added being in the proportion of about 1.3 pounds of water per pound of aged rock mix on a dry basis. The rate of addition of aged acidulated rock mix to the countercurrent extraction was about 18 pounds per minute and the water about 2 gallons per minute. The finished monocalcium phosphate leached solution was produced at the rate of about 1.5 gallons per minute, having a gravity of about 30° Bé. at 108° F. The solution had the following analyses:

| Ingredient: | Percent by weight |
| --- | --- |
| $P_2O_5$ | 20.4 |
| F | 1.05 |
| $SO_4$ | 1.1 |
| CaO | 4.7 |
| $U_3O_8$ | 0.0035 |

The leached solution was subjected to contact with about 2300 grams of powdered metallic iron per 100 gallons of leached solution and agitated for about 30 minutes, after which the solids were filtered from the solution. This liquid was then thoroughly contacted at the rate of about 100 gallons per hour of an organic solvent composed of about 9 parts by volume of kerosene and one part by volume of a mixture of the mono- and di-esters of the ortho phosphoric acid of n-octyl alcohol. The intimate contact was maintained for about 2 minutes. The organic solvent was separated from the aqueous phase and then processed in accordance with the preceding description to recover $P_2O_5$ values as defluorinated dicalcium phosphate. The uranium enriched organic solvent was treated with about 10 gallons per hour of 30% aqueous sulfuric acid to precipitate calcium sulphate. The aqueous slurry was removed and discarded and the rich organic solvent was treated with about 10 gallons per hour of 15% aqueous hydrofluoric acid with agitation. The precipitate was filtered from the aqueous phase and approximately 0.031 pounds $U_3O_8$ as a 60% uranium tetrafluoride cake is recovered per hour.

*Example II*

The ground rock portion B from Example I was fed to the paddle mixer at the continuous rate of about 2 tons per hour. Simultaneously therewith there was added a solution prepared in a holding tank by bubbling gaseous chlorine through an aqueous sulfuric acid of approximately 51° Bé. at 60° F. This chlorine saturated sulfuric acid was fed to the mixer to the extent of about 110% acidulation or at a rate of about 0.95 tons per hour. The soupy mix was continuously discharged after retention time in the mixer of about one minute to a continuous moving belt. After about one hour on the belt, the set-up mix was discharged to a storage pile where it was allowed to stand undisturbed for about 30 days.

The friable cured acidulated rock mix was subjected to a four stage leaching operation, the water added being in the proportion of about 1.3 pounds of water per pound of aged rock mix on a dry basis. The rate of addition of aged acidulated rock mix to the countercurrent extraction was about 18 pounds per minute and the water about 2 gallons per minute. The finished monocalcium phosphate leached solution was produced at the rate of about 1.5 gallons per minute, having a gravity of about 30° Bé. at 108° F. The solution had the following analyses:

Ingredient: Percent by weight

| | |
|---|---|
| $P_2O_5$ | 20.2 |
| F | 1.02 |
| $SO_4$ | 0.97 |
| CaO | 4.8 |
| $U_3O_8$ | 0.011 |

The leached solution was subjected to contact with about 2300 grams of powdered metallic iron per 100 gallons of leached solution and agitated for about 30 minutes, after which the solids were filtered from the solution. This liquid was then thoroughly contacted at the rate of about 100 gallons per hour with 10 gallons per hour of an organic solvent composed of about 9 parts by volume of kerosene and one part by volume of a mixture of the mono- and di-esters of the ortho phosphoric acid and n-octyl alcohol. The intimate contact was maintained for about 2 minutes. The organic solvent was separated from the aqueous phase and then processed in accordance with the preceding description to recover $P_2O_5$ values as defluorinated dicalcium phosphate. The uranium enriched organic solvent was treated with about 10 gallons per hour of 30% aqueous sulfuric acid to precipitate calcium sulfate. The aqueous slurry was removed and discarded and the rich organic solvent was treated with about 10 gallons per hour of 15% aqueous hydrofluoric acid with agitation. The precipitate was filtered from the aqueous phase and approximately 0.10 pound $U_3O_8$ as a 60% uranium tetrafluoride cake is recovered per hour.

*Example III*

Portion C of the rock prepared in Example I was fed at the continuous rate of about 2 tons per hour to the same paddle mixer as was used in Example I. To this rock in the paddle mixer was added approximately 51° Bé. sulfuric acid at about 115° F. to the extent of about 110% acidulation at the rate of about 0.94 tons per hour. Simultaneously therewith there was introduced into the mixer chlorine gas at the rate of approximately 4 pounds of 100% chlorine per 100 pounds of rock. The soupy mix was continuously discharged onto a moving belt. After about one hour on the belt the mix was discharged to a storage pile where it was allowed to stand undisturbed for about 30 days.

The friable cured acidulated rock mix after standing about 30 days was subjected to a continuous countercurrent four stage leaching operation with water. The water was added in the proportion of about 1.3 pounds of water per pound of aged acidulated rock mix. The rate of addition of aged acidulated rock mix to the countercurrent extraction was about 18 pounds per minute and the water about 2 gallons per minute. The finished leached solution had a gravity of about 30° Bé. at 108° F. Approximately 114 pounds reaction insolubles per 100 pounds of cured superphosphate were obtained from the filter. The leached solution and solids had the following analyses:

| Ingredients | Leached Solution, Percent By Weight | Solids, Percent By Weight |
|---|---|---|
| $P_2O_5$ (total) | 19.9 | 2.89 |
| $P_2O_5$ (citrate sol.) | | 1.74 |
| $P_2O_5$ (water sol.) | | 1.30 |
| F | 0.95 | |
| $SO_4$ | 1.1 | 30.1 |
| CaO | 4.7 | |
| $U_3O_8$ | .0006 | 0.0218 |
| $H_2O$ | | 42.7 |
| Wt. per 100 lbs. superphosphate | 82 | 114 |

The filter cake was fed at a continuous rate of about 2 tons per hour on a dry basis to the paddle mixer initially used for rock acid mix. Simultaneously there was added to the paddle mixer approximately 51° Bé. aqueous sulfuric acid at about 115° F. Addition of acid was to the extent for producing phosphoric acid, or at a rate of about 0.2 tons per hour of 51° Bé. sulfuric acid. The slurry after about 60 minutes reaction time was leached with water and the reaction insolubles discarded. Approximately 9.2 gallons of solids free solution were recovered. The solution had the following analyses:

Ingredient: Percent by weight

| | |
|---|---|
| $P_2O_5$ | 10.0 |
| F | 0.3 |
| $SO_4$ | 1.9 |
| CaO | 0.3 |
| $U_3O_8$ | 0.04 |

The leached solution was subjected to contact with about 2300 grams of powdered metallic iron per 100 gallons of leached solution and agitated for about 30 minutes, after which the solids were filtered from the solution. This liquid was then thoroughly contacted at the rate of about 100 gallons per hour with 10 gallons per hour of an organic solvent composed of about 9 parts by volume of kerosene and one part by volume of a mixture of the mono- and di-esters of the ortho phosphoric acid and n-octyl alcohol. The intimate contact was maintained for about 2 minutes. The organic solvent was separated from the aqueous phase and then processed in accordance with the preceding description to recover $P_2O_5$ values as defluorinated dicalcium phosphate. The uranium enriched organic solvent was treated with about 10 gallons per hour of 30% aqueous sulfuric acid to precipitate calcium sulfate. The aqueous slurry was removed and discarded and the rich organic solvent was treated with about 10 gallons per hour of 15% aqueous hydrofluoric acid with agitation. The precipitate was filtered from the aqueous phase and approximately 0.36 pounds $U_3O_8$ as uranium tetrafluoride is recovered per hour.

From a study of the data shown in the above examples, it is apparent that chlorine, contrary to the action of normal oxidizing agents, suppresses the solubility of uranium compounds when introduced as a gas into a rock-acid mix. Further, it will be seen that a solution containing uranium is obtained in the second digestion having about an eight fold increase in uranium concentration per unit of $P_2O_5$ than is obtained by normal digestion processes heretofore in use. The smaller volume and higher uranium concentration results in improved uranium extraction operations and higher recoveries of $P_2O_5$ constituents.

Having thus described my invention, what I claim is:
1. The process of recovering mineral values which comprises admixing phosphate rock and sulfuric acid to form a pasty acid mix, said sulfuric acid being added in an amount sufficient to produce predominantly monocalcium phosphate, mixing gaseous chlorine into the admixture, leaching the admixture with aqueous medium, sep- arating insoluble material from aqueous solution of reaction products, reacting the insoluble material with sufficient sulfuric acid to convert the previously unreacted material to water soluble reaction products, contacting the solution of water soluble reaction products with an agent for selectively removing uranium values therefrom and recovering from the aqueous solution of reaction products at least, the $P_2O_5$ components.

2. The process of recovering mineral values which comprises admixing phosphate rock and sulfuric acid to form a pasty acid mix, said sulfuric acid being added as aqueous solution of between about 60% and about 75% strength and being added to the extent of between about 90% and about 120% acidulation of that required to form monocalcium phosphate and to react with the reactable impurities present in the rock, mixing gaseous chlorine into the admixture, aging the admixture, leaching the aged admixture with aqueous medium, separating insoluble material from aqueous solution of reaction products, reacting the insoluble material with sufficient sulfuric acid to produce a predominantly phosphoric acid solution, contacting the phosphoric acid solution with an agent for selectively removing uranium values therefrom and recovering from the aqueous solution of reaction products and the phosphoric acid solution, at least, the $P_2O_5$ components.

3. The process of recovering mineral values which comprises admixing phosphate rock and sulfuric acid to form a pasty acid mix, said sulfuric acid being added in an amount sufficient to produce predominantly monocalcium phosphate, mixing gaseous chlorine into the acid mix in a quantity to incorporate between about 0.5 pounds and about 10 pounds of chlorine per 100 pounds of acid mix, leaching the admixture with aqueous solution of reaction products, reacting the insoluble material with sufficient sulfuric acid to produce a predominantly phosphoric acid solution, contacting the phosphoric acid solution with an agent for selectively removing uranium values therefrom and recovering from the aqueous solution of phosphoric acid solution, at least, the $P_2O_5$ components.

4. The process of claim 3 wherein the quantity of gaseous chlorine incorporated is between about 2 pounds and about 5 pounds per 100 pounds of acid mix.

5. A process as in claim 4 wherein the phosphoric acid solution is treated to selectively remove uranium values with a phosphoric acid ester of an alkyl monohydric alcohol.

6. A process as in claim 4 wherein the solids-free phosphoric leached solution is treated with sufficient basic inorganic oxygen-containing compounds of calcium to convert the monocalcium phosphate to dicalcium phosphate and recovering the precipitated dicalcium phosphate therefrom.

7. A process as in claim 4 wherein the solids-free leached solution is treated with a basic inorganic oxygen-containing compound of an alkaline earth metal only in sufficient amount to combine with the fluorine present therein, separating the precipitated solids and treating the resultant solution with sufficient basic inorganic oxygen-containing compound of calcium to convert the monocalcium phosphate to dicalcium phosphate and recovering the dicalcium phosphate therefrom.

8. A process as in claim 4 wherein the extract solution and the phosphoric acid solution after removal of uranium values are combined and the resulting solution treated with sufficient basic inorganic oxygen-containing compound of calcium to precipitate substantially all of the phosphates as calcium compounds.

9. The process of recovering mineral values which comprises admixing phosphate rock and sulfuric acid to form a pasty acid mix, said sulfuric acid being added in an amount sufficient to produce predominantly monocalcium phosphate, leaching the admixture with aqueous medium, separating insoluble material from aqueous solution of reaction products, reacting the insoluble material with sulfuric acid, said acid being added to the extent of between about 101% and about 120% acidulation of that required to form phosphoric acid, contacting the phosphoric acid with a phosphoric acid ester agent for selectively removing uranium values therefrom and recovering from the aqueous solution of reaction products and the phosphoric acid solution, at least the $P_2O_5$ component.

10. A process of recovering mineral values which comprises admixing phosphate rock with approximately 51° Bé. sulfuric acid at about 115° F. to the extent of about 110% acidulation, simultaneously introducing gaseous chlorine at the rate of approximately 4 pounds of 100% chlorine per 100 pounds of rock into the mixer, aging the acid mix for about 30 days, leaching the aged acid mix countercurrently with aqueous medium, filtering the leach slurry to recover solids and a leach solution of about 30° Bé. specific gravity, digesting the separated solids with approximately 51° Bé. sulfuric acid to produce a phosphoric acid solution, filtering insoluble material from the phosphoric acid digest solution, contacting the solution with metallic iron to effect reduction of the solution, contacting the reduced solution with an extractant medium for uranium comprising organic extender and a phosphoric acid ester of octyl alcohol, separating extracted solution and uranium rich ester solution, precipitating calcium from enriched extractant solution with sulfuric acid, filtering out the precipitate, reacting solids-free extractant solution with hydrofluoric acid to precipitate uranium as $UF_4$, and recovering $P_2O_5$ values from the uranium free-reduced aqueous solution.

No references cited.